(12) United States Patent
Cooper et al.

(10) Patent No.: US 7,766,493 B2
(45) Date of Patent: Aug. 3, 2010

(54) OPTICAL DISPLAY DEVICE WITH ASYMMETRIC VIEWING AREA

(75) Inventors: Terence Alfred Cooper, Newark, DE (US); Adnan Malik, Los Angeles, CA (US); Yu Huang, Los Angeles, CA (US)

(73) Assignee: Luminoz, Inc. (JP)

( * ) Notice: Subject to any disclaimer, the term of this patent is extended or adjusted under 35 U.S.C. 154(b) by 158 days.

(21) Appl. No.: 11/658,522

(22) PCT Filed: Jul. 22, 2005

(86) PCT No.: PCT/US2005/026362
§ 371 (c)(1),
(2), (4) Date: Nov. 6, 2008

(87) PCT Pub. No.: WO2006/014883
PCT Pub. Date: Feb. 9, 2006

(65) Prior Publication Data
US 2009/0067157 A1     Mar. 12, 2009

Related U.S. Application Data

(60) Provisional application No. 60/592,008, filed on Jul. 29, 2004.

(51) Int. Cl.
*G02B 27/00* (2006.01)
(52) U.S. Cl. .................. 359/614; 359/601; 359/613
(58) Field of Classification Search .............. 359/614, 359/301, 613
See application file for complete search history.

(56) References Cited

U.S. PATENT DOCUMENTS

| | | | |
|---|---|---|---|
| 2,180,113 A | 11/1939 | Land | |
| 2,287,556 A | 6/1942 | Land | |
| 4,165,153 A | 8/1979 | Land | |
| 5,237,004 A | 8/1993 | Wu et al. | |
| 5,307,205 A | 4/1994 | Ludwig, Jr. et al. | |
| 5,346,954 A | 9/1994 | Wu et al. | |
| 5,432,636 A | 7/1995 | Ishii et al. | |
| 5,457,572 A | 10/1995 | Ishii et al. | |
| 5,543,870 A | 8/1996 | Blanchard | |
| 5,745,199 A | 4/1998 | Suzuki et al. | |
| 5,783,120 A | 7/1998 | Ouderkirk et al. | |
| 5,824,174 A | 10/1998 | Mitani et al. | |
| 5,932,342 A | 8/1999 | Zeira et al. | |
| 5,991,077 A | 11/1999 | Carlson et al. | |
| 6,141,149 A | 10/2000 | Carlson et al. | |
| 6,256,145 B1 | 7/2001 | Kono et al. | |
| 6,297,906 B1 | 10/2001 | Allen et al. | |
| 6,346,311 B1 | 2/2002 | Yeo et al. | |
| 6,531,230 B1 | 3/2003 | Weber et al. | |
| 6,582,783 B2 | 6/2003 | Hiraishi et al. | |
| 6,693,746 B1 | 2/2004 | Nakamura et al. | |
| 6,727,313 B2 | 4/2004 | Zhou et al. | |
| 6,797,366 B2 | 9/2004 | Hanson et al. | |
| 6,808,658 B2 | 10/2004 | Stover | |
| 6,819,468 B2 | 11/2004 | Dho | |
| 6,819,486 B2 | 11/2004 | Ma et al. | |
| 6,875,512 B2 | 4/2005 | Yabuki | |
| 6,908,647 B2 | 6/2005 | Obayashi et al. | |
| 6,917,400 B2 | 7/2005 | Nakamura et al. | |
| 6,942,959 B2 | 9/2005 | Dubin et al. | |
| 6,992,831 B2 | 1/2006 | Nagasawa et al. | |
| 7,067,188 B1 | 6/2006 | Yang et al. | |
| 2003/0039036 A1 | 2/2003 | Kruschwitz et al. | |
| 2003/0203458 A1 | 10/2003 | Kozaki et al. | |
| 2004/0066645 A1 | 4/2004 | Graf et al. | |
| 2005/0036199 A1 | 2/2005 | Ma et al. | |

FOREIGN PATENT DOCUMENTS

JP     4314522     5/1992

OTHER PUBLICATIONS

International Search Report from Application No. PCT/US05/26362 dated Jul. 7, 2008.

*Primary Examiner*—Joshua L Pritchett
(74) *Attorney, Agent, or Firm*—Carter, DeLuca, Farrell & Schmidt, LLP

(57) ABSTRACT

The present disclosure provides optical devices having an asymmetric viewing area imparting improved optical properties to the device.

35 Claims, No Drawings

OPTICAL DISPLAY DEVICE WITH ASYMMETRIC VIEWING AREA

CROSS REFERENCE TO RELATED APPLICATIONS

The present application claims the benefit and priority to International PCT Application NO. PCT/US2005/026362 filed on Jul. 22, 2005 which, in turn, claims the benefit of and priority to U.S. Provisional Patent Application Ser. No. 60/592,008 filed on Jul. 29, 2004, the entire disclosure of which is hereby incorporated by reference herein.

BACKGROUND

Recent advances in projection television, interactive whiteboards, digital signage, liquid crystal displays and other display technologies have led to the need for the development of increasingly large display screens in both the transmission and reflection modes. High performance rear projection screens require balanced characteristics of resolution, gain, contrast and wide viewing angle. The screen must provide sufficient resolution to display sharp images for both video and data presentation and must, at the same time, cause diffusion of the light in such a way as to provide a wide viewing audience angle while still providing high brightness and high contrast, particularly for viewing in the presence of ambient light. A gray or black tint is generally incorporated in monolayer diffusion screens to provide this required contrast.

However, while it is necessary for these display technologies to provide a wide viewing angle in the horizontal direction, it is often desirable to have a much smaller viewing angle in the vertical direction, the requirements for this depending on the specific application. For example, in many display and projection screen applications, it is desirable to have a broad horizontal viewing angle because a viewer may be positioned to the side of the screen, while there is generally no need for the vertical viewing angle to be as broad because the viewer is generally positioned with the screen at or near eye level. Thus it can be desirable to have an anisotropic or elliptical display with a comparatively wide horizontal viewing angle but a comparatively narrow vertical viewing angle. This asymmetric or elliptical viewing field has the advantage that, since the total light energy transmitted through the screen is constant depending on the light engine, if the viewing field in the vertical direction is truncated or otherwise shortened, then more energy is available for increasing the horizontal viewing angle or for increasing the screen gain (brightness) or a combination of these.

Systems using lenticular lens designs where one-dimensional lens structures are molded onto plastic substrates are well known in the art and have become a major current projection television screen technology to provide such screens with an asymmetric viewing area. Light is focused by the cylindrical type of lens structure onto a second diffusive film or layer to produce asymmetric diffusion. However, such lenticular-based screens are limited in the size which can be manufactured, because of the practical limitations in size of the lenticular embossing roll, and in their resolution, which is limited by the lenticular pitch which can be manufactured. In addition, the lenticular-type lenses contain a series of grooves which can be expressed as a frequency, and this frequency can interfere with the pixel frequency in liquid crystal-based and other microdisplay-based projection displays and generate Moiré fringes. As a result, the currently available lenticular screens are limited for high definition image displays in which the pixel frequencies are higher.

Light scattering systems are known in the art which employ asymmetric scattering particles as a dispersed phase in a transparent matrix material to produce an asymmetric light scattering pattern. These systems fall into two basic types, one using incompatible polymers where the discontinuous phase particles are elongated by shear in processing to provide such asymmetric particles, and the other using preformed elongated organic or inorganic materials which are then oriented during processing to give the same effect.

The optical properties of the resultant asymmetric diffuser systems are determined by the refractive index difference between the matrix and the dispersed phase, and the size, location, shape, aspect ratio and orientation of the elongated structures of the dispersed phase. These factors can be varied to provide an optical element with predetermined optical properties. Thus, the largest scattering angles occur in directions substantially perpendicular to the major axes of the elongated diffuser structures, while conversely the smallest scattering angles occur in directions substantially parallel to the major axes of the elongated structures. Such properties are particularly useful for displays and projection screens.

With regard to asymmetric diffuser systems employing incompatible polymers, i.e., where the discontinuous phase scattering materials are elongated by shear during processing to provide elongated particles, U.S. Pat. Nos. 5,932,342 and 6,346,311 disclose such systems.

Similarly, Japanese Patent Application Kokai 314522/1992 describes an anisotropic light scattering material including a transparent matrix material and a dispersed phase of transparent diffuser particles for use for projection television screens. U.S. Pat. No. 6,582,783 discloses laminated films comprising an anisotropic light-scattering layer and a transparent resin layer laminated to at least one side of the light-scattering layer.

U.S. Pat. Nos. 6,727,313 and 6,819,468, and US Patent Application 20050036199 also disclose screens for managing light, including front and rear projection screens, including a substrate layer and a polymeric composition of an adhesive matrix material containing a dispersed phase of elongated structures disposed on the substrate.

Difficulties with the use of the above systems include the facts that they are either not applicable to the manufacture of rigid screens incorporating rigid diffuser layer elements, or the incompatible polymer systems are extremely difficult to control in a practical processing environment where it is necessary to make wide extruded or coextruded sheets with precisely controlled morphology, structures and thicknesses in order to provide the desired optical, physical and thermal properties to the resulting device. Moreover, it is difficult to provide stable colloidal systems so as to prevent any changes or reagglomeration of the diffuser particles or migration to the surface or an interface during sheet extrusion, thereby causing an undesirable deterioration or loss of the designed optical, physical and thermal properties. In addition, these systems do not show an optimal combination of optical properties such as brightness (gain), scattering angles in the horizontal and vertical directions, contrast and resolution.

Consequently, there is still a need for the development of improved inexpensive and efficient front- and rear-projection screens and displays with desirable combinations of the above light-scattering and transmission properties, in particular with controlled light scattering asymmetry, to provide such advantageous combinations of brightness, contrast, resolution and wide viewing angle in those directions which are important for the intended application and a narrower viewing angle in other directions where such wide viewing angle is unnecessary. This need is now addressed by the asymmetric viewing area optical display device of this present disclosure.

SUMMARY

The present disclosure provides an asymmetric viewing area optical display device having one or more light-scattering layers which, in turn, include at least one thermoplastic matrix and at least one dispersed phase, wherein the dispersed phase of the light scattering layer encompasses from about 0.2% to about 50% by volume of the light scattering layer.

The asymmetric viewing area optical display device of the present disclosure may, in some embodiments, include one or more radiation, preferably visible spectrum, scattering layers and optionally one or more radiation absorption layers, contrast control layers, interfacial layers, adhesive layers, protective layers, anti-glare layers, anti-reflection layers, antistatic layers, light focusing or light angle modification layers, reflecting layers and/or supporting layers.

Both monolayer and multilayer devices possessing such light scattering layers are provided.

In some embodiments an additional layer of the optical device includes an absorption layer. In other embodiments, an additional layer of the optical device includes a contrast-control layer.

DETAILED DESCRIPTION

The present disclosure includes an asymmetric or elliptical viewing area monolayer or multilayer optical device for the display of projected light images by transmission or reflection. The optical device includes one or more light-scattering layers having a thermoplastic or thermoset matrix, and optionally one or more light absorption or contrast control layers, each such light-scattering, absorption, and contrast control layer having a thermoplastic or thermoset matrix, and a reflection layer when the device is used in the reflection mode.

The present disclosure further relates to an asymmetric or elliptical viewing area optical device whereby simultaneous combinations of high transmission gain (or brightness) can be obtained with high contrast, high resolution and a wide viewing angle in the horizontal direction together with a smaller and controllable viewing angle in the vertical direction. This viewing angle is measured in terms of the light-scattering half angle, i.e. the angle from the normal angle to the surface at which the transmission is half that at the normal angle.

The terms "horizontal" and "vertical" are used here for convenience with reference to one specific application of the device, that of a projection television. However, these terms simply refer to the fact that the viewing angle in one direction is controlled to be larger than the viewing angle in a second direction, which is at right angles to the first direction so as to produce an asymmetric or elliptical viewing area, and is not intended to preclude the use of the optical device of the present disclosure in any other applications where the desired viewing angle is larger in the vertical direction and smaller in the horizontal direction, or where such a difference in viewing angles is desired between any two directions at right angles, whether or not they are the horizontal and vertical directions.

The polymeric material utilized to form the light-scattering layer of the device of the present disclosure may include, in some embodiments, an amorphous thermoplastic matrix resin containing light scattering domains or particles which provide the desired light scattering or diffusion properties when incorporated into the multilayer optical device.

Suitable amorphous thermoplastic resins should have a heat distortion temperature of at least about 60° C., typically at least about 80° C., and more typically at least about 100° C., as measured at 66 psi according to the method of ASTM D648. Suitable thermoplastic resins are those with high clarity and include, for example, polyalkyl and aralkyl methacrylate polymers such as polymethyl methacrylate and methacrylate copolymers, polymethyl methacrylate/alkyl acrylate copolymers, styrenic polymers such as polystyrene, polyalkylstyrenes and styrenic copolymers such as styrene-acrylonitrile copolymers, styrene-acrylonitrile-methyl methacrylate copolymers and styrene-methyl methacrylate copolymers, polycarbonates and polycarbonate copolymers, polysulfones, polyolefins, olefin copolymers, cyclic polyolefins, cellulose esters, polyamides, polyesters, polyolefins such as polyethylene or polypropylene, copolymers comprising ethylene and propylene, random, block and graft copolymers of polyolefins such as anhydride-grafted or imide-modified copolymers and olefin-vinyl acetate copolymers such as ethylene-vinyl acetate, olefin-acrylic acid and olefin-methacrylic acid copolymers, silicone polymers and copolymers such as silicone-urea and silicone-urethane copolymers, polymethyl pentene polymers, polyetherimides, polyetherimide sulfones, polysulfones, polyethersulfones, polyphenylene ether sulfones, poly(arylene ether)s, polyglutarimide, polycarbonates, polyester carbonates, polyarylates, and the like, and mixtures thereof.

Where necessary to provide the requisite impact resistance, such matrix polymers can be impact modified or toughened if desired so long as the method of impact modification, such as rubber toughening, does not adversely affect and undesirably reduce the optical transmission properties of the polymer. These thermoplastics and methods for their preparation are within the purview of those skilled the art.

The scattering layer typically includes dispersed phase domains or particles which control light scattering and provide the elliptical or asymmetric scattering characteristics of the asymmetric viewing area of the optical device of the present disclosure. Such domains or particles can be polymeric domains which are immiscible in the thermoplastic matrix as a result of the use of a composition for the light scattering layer which is an immiscible polymer blend. Such domains or particles then form elongated or asymmetric shapes resulting from shear forces or orientation in the flow field during processing or from subsequent stretching or orientation of the initially formed sheet following processing to form the sheet or other desired shape. These immiscible blends may be selected to advantageously provide such polymeric domains.

The polymeric materials utilized can be immiscible blends where the compositions, physical and chemical properties of the dispersed phase and matrix materials and the processing conditions are selected to provide elongated domains or particles during processing or as a result of some downstream process such as stretching or thermoforming. The particles can also be preformed polymeric particles, crosslinked polymeric particles or core-shell particles which are already asymmetric or can undergo deformation to provide elongated or asymmetric domains during processing or in a subsequent forming step.

Suitable immiscible domains or particles can include, for example, thermoplastic or elastomeric resins such as polyalkyl and aralkyl acrylate and methacrylate polymers such as polybutyl acrylate and polymethyl methacrylate, methacrylate polymers and copolymers, acrylate polymers and copolymers, styrenic polymers and copolymers such as polystyrene, polyalkylstyrenes and styrenic random and block copolymers, for example styrene-acrylonitrile copolymers, styrene-acrylonitrile-methyl methacrylate copolymers, styrene-methyl methacrylate copolymers, styrene-acrylate copolymers, styrene-butadiene and styrene-isoprene copolymers or hydrogenated or copolymerized versions thereof, polycarbonates and polycarbonate copolymers, polysulfones, cyclic polyolefins, cellulose esters, carboxylated cellulose derivatives, polyamides, polyesters such as polyethylene terephthalate, polyethylene naphthalate, polybutylene terephthalate, liquid crystal polymers, block copolyesters and block copolyester elastomers, polyolefins such as polyethylene or polypropylene, olefin copolymers comprising ethylene and propylene, random, block and graft copolymers of polyolefins such as anhydride-grafted or imide-modified copolymers, acid copolymers and ionomers, olefin-vinyl acetate copolymers, silicone polymers and copolymers such as silicone-urea and silicone-urethane copolymers, polymethyl pentene polymers, polyetherimides, polyetherimide sulfones, polysulfones, polyethersulfones, polyphenylene ether sulfones, poly(arylene ether)s, polyglutarimide, polyester carbonates, polyarylates, thermoplastic urethane polymers, block copolymer elastomers and the like, and mixtures thereof. These thermoplastics and methods for their preparation are within the purview of those skilled in the art.

The immiscible domains or particles of the light scattering layer can also include preformed discrete elongated acicular, rod-like, ellipsoidal, prismatic or platy immiscible glass, mineral, or ceramic particles such as high aspect ratio glass particles, wollastonite, strontium carbonate or clay which can similarly be oriented during processing or in a subsequent forming step.

In addition to the elongated domains or particles disclosed above, which produce and control the asymmetric or elliptical viewing area of the present devices, other scattering components which do not in themselves produce asymmetric or elliptical scattering but are characterized by producing symmetrical or circular scattering patterns can also be incorporated in the light scattering layer. These other components may be used to modify the asymmetry or elliptical scattering characteristics produced by the elongated domains or particles to allow the shape of the viewing area to be modified and controlled.

Such additional scattering components include preformed particulate structures, including thermoplastic or thermoset resin particles such as alkyl (meth)acrylate-type resins, styrenic-type resins, vinyl carboxylate resins and polysiloxane-type resins. These components may be homopolymers, copolymers, or mixtures, as well as crosslinked materials, core-shell or multi-staged polymeric materials or any other suitable spherical organic particles.

Such additional scattering components may also include mineral, glass or ceramic particles, for example glass beads, inorganic oxides such as silica, alumina, titanium dioxide, antimony oxide, zinc oxide, zirconia, and tungsten oxide, silicate-based and aluminosilicate-based minerals or inorganic carbonates such as calcium carbonate or barium carbonate, or any other suitable spherical inorganic particles.

The light scattering domains or particles can also be preformed discrete elongated acicular, rod-like, ellipsoidal, prismatic or platy immiscible glass, mineral, or ceramic particles such as wollastonite or clay. In some embodiments, such preformed discrete particles can include glass, ceramic or inorganic particles which have been coated with or encapsulated in other organic or inorganic materials or polymeric materials to modify their interactions with the matrix materials or/and to provide a graduated modification of the refractive index of the dispersed particles.

The scattering layer or layers may include one or more types of thermoplastic film or sheet and the degree and type of scattering in the scattering layers may be controlled by the composition, thickness and method of processing of the thermoplastic film or sheet which forms these layers.

Whichever types of scattering domains or particles are selected, the combinations of types and concentrations of elongated domains or particles and spherical domains and particles, as well as the matrix material, should be selected to produce the desired combinations of optical properties. The desired optical properties include scattering properties and their asymmetry, resolution, contrast, transmission and brightness properties, which may be adjusted depending on the specific application for use. The optimum concentrations of the various diffuser domains and particles will depend on the scattering properties required and the refractive index differentials between the various diffuser particles and the matrix.

The light scattering compositions of the present disclosure may also incorporate compatibilizers, polymeric surfactants or coupling agents to make the dispersion of the dispersed phase in the matrix continuous phase more stable. These materials may also prevent the dispersed phase from re-agglomerating, blooming to the surface, migrating to the interface, or plating out from the sheet structure during or after processing and forming operations and may provide more stable processing characteristics. Such compatibilizers include block copolymers such as styrene-butadiene or styrene-isoprene block copolymers or hydrogenated or copolymerized versions thereof. Other compatibilizers include random, block or graft copolymers of ethylene and/or propylene with polar comonomers such as acrylate esters, anhydrides such as maleic anhydride, methacrylate esters, acids such as acrylic acid and methacrylic acid, acid ionomers, and carbon monoxide and similar polar compounds imparting increased stability and processability. Suitable coupling agents include organosilane, organotitanium, organozirconium, and organoaluminum compounds and the like.

The scattering layer typically includes or contains domains or particles with elongated, ellipsoidal, rod-like, acicular, prismatic or platy shapes of suitable aspect ratio greater than 1, which control scattering. These domains or particles can be formed from immiscible polymer blends as a result of shear forces or orientation during processing, or subsequent operations involving stretching or orientation of the film or sheet to deform the domains or particles. In some embodiments these domains or particles can be preformed thermoplastic or thermoset particles, crosslinked particles or core-shell particles which already have an elongated shape or can be deformed during processing or subsequent operations provide an elongated shape, or discrete immiscible high aspect ratio particles of glass, mineral, or ceramic particles such as wollastonite, which control scattering. The light absorbent material, which can be incorporated in the scattering layer(s) or be present in a separate layer or layers or contrast control grids, can include a carbon black or other colored pigment, or a soluble dye such as a soluble black dye, for example an anthraquinone dye.

The thermoplastic matrix material of the scattering layer, and the thermoplastic, thermoset, glass, mineral or ceramic light scattering domains or particles dispersed in the matrix of the scattering layer, which control light scattering, have a difference in refractive index in the range of from about 0.002 units to about 0.1 units, typically from about 0.01 units to about 0.03 units, and more typically from about 0.01 units to about 0.02 units. The light scattering domains or particles may have a mean diameter in the minor direction in the range of from about 0.2 microns to about 20 microns, typically from about 0.5 microns to about 10 microns, and a length in the major direction in the range of from about 1 micron to about 200 microns.

In order to control the optical and scattering properties of the scattering layer, while at the same time allowing suitable physical, mechanical and thermal properties to be maintained by this layer, the volume fraction of the thermoplastic, thermoset, glass, mineral or ceramic light scattering domains or particles dispersed in the matrix of the scattering layer, which control light scattering but can also affect physical, mechanical and thermal properties, is generally in the range of from about 0.2% to about 50%. In other words, the dispersed phase of the light scattering layer comprises from about 0.2% to about 50% by volume of the light scattering layer. These domains or particles form a stable dispersion in the said matrix material and do not substantially agglomerate during the processing and production of the scattering layer of the multilayer optical device.

The compositions, physical and chemical properties of the dispersed phase and the matrix materials utilized and the processing conditions may be selected to provide elongated domains or particles during processing or as a result of some downstream operation such as stretching or thermoforming. In addition, the dispersed phased domains or particles can be preformed polymeric particles, crosslinked polymeric particles or core-shell particles which are already asymmetric or can undergo deformation to provide elongated or asymmetric domains during processing or in any subsequent forming step.

In some embodiments, devices of the present disclosure may optionally include one or more absorption layers, for example contrast control or contrast grid layers including light absorption or discontinuous contrast grid layers, reflection layers for use in reflection mode, interfacial layers, adhesive layers, protective layers, matte, anti-reflection, anti-glare, antistatic or embossed surface layers, light focusing or light angle modification layers such as Fresnel, lenticular or other prism structures, and supporting layers.

Where present, the absorption layer or layers may include one or more types of thermoplastic matrix and the degree and type of absorption in the absorption layers may be controlled by the composition, thickness and method of processing of the thermoplastic film or sheet which comprises these layers. The thermoplastic matrix used to form the absorption layer or layers may be the same or different as the thermoplastic matrix used to form the light-scattering layer.

This light absorbing or contrast layer may include a discontinuous contrast grid pattern, rather than a continuous absorption layer. Such a grid pattern may include an appropriate absorber applied onto or into the separate absorbent layer or incorporated onto or into other structural elements such as focusing prisms, light angle modification structures, fresnel lens-type structures, and lenticular lens-type structures. Processes used for applying the grid pattern include, but are not limited to, printing, scribing, embossing, laser marking, photopolymerization, photomasking techniques, or other suitable means. If a contrast grid is used, the degree and type of absorption in the contrast grid layer may be controlled by selection of the types and amounts of the dyes or pigments utilized and the grid pattern, dimensions, location, spacing and positioning.

The magnitude and frequency characteristics of the absorption of absorptive material(s) in the radiation scattering layer system or in the optional absorption layer(s) may be controlled by the compositions and processing methods used, and the degree and type of absorption in the optional contrast control layers when they are in the form of contrast grids or louvers are controlled by selection of the types and amounts of the dyes or pigments utilized and the grid or louver pattern, dimensions, spacing, location and positioning. As used herein, a "grid" may include an organized geometric pattern having spaces and solid components, e.g. crisscrossed, curved or parallel lines, and may include such a design or shape such as a louver. In some embodiments, a grid of the present disclosure may have a pattern, and be referred to herein, as a "louver".

In some embodiments of the present disclosure, a light absorbing material or tint or contrast agent may be incorporated in at least one scattering layer to control, as desired, the light transmission through the layer and the frequency, color and contrast properties of the resulting asymmetric or elliptical scattering optical device. This light absorbing material may include soluble or insoluble color or contrast agents, which can be colored or black dyes or pigments, for example, a carbon black pigment or other pigment. In other embodiments, the light absorbing material may be a soluble dye, for example a polymer-soluble black anthraquinone dye. All of these light absorbing materials are commercially available.

In other embodiments of the present disclosure, the light absorbing material may be contained in at least one separate light absorption or contrast control layer rather than being incorporated in the scattering layer(s). This light absorption layer may include a polymeric material, typically an amorphous thermoplastic resin, containing a light absorber to control, as desired, the light transmission through the layer and the frequency, color and contrast properties of the resulting multilayer structure when used in the asymmetric or elliptical scattering view optical device of the present disclosure. Suitable amorphous thermoplastic resins should have a heat distortion temperature of at least about 60° C., typically at least about 80° C., and more typically at least about 100° C., as measured at 66 psi according to ASTM D648.

Suitable thermoplastic resins include those described above for use in the scattering layer and are those with high clarity. Such resins include, for example, polyalkyl and aralkyl methacrylate polymers such as polymethyl methacrylate and methacrylate copolymers, styrenic polymers such as polystyrene, polyalkylstyrenes and styrenic copolymers such as styrene-acrylonitrile copolymers, styrene-acrylonitrile-methyl methacrylate copolymers and styrene-methyl methacrylate copolymers, polycarbonates and polycarbonate copolymers, polysulfones, cyclic polyolefins, cellulose esters, polyamides, polyesters, polyolefins such as polyethylene or polypropylene and copolymers comprising ethylene and propylene, including random, block and graft copolymers of polyolefins such as anhydride-grafted or imide-modified copolymers, olefin-vinyl acetate copolymers, olefin-acrylic acid copolymers, olefin-methacrylic acid copolymers, silicone polymers and copolymers such as silicone-urea and silicone-urethane copolymers, polymethyl pentene polymers, polyetherimides, polyetherimide sulfones, polysulfones, polyethersulfones, polyphenylene ether sulfones, poly(arylene ether)s, polyglutarimide, polyester carbonates, polyarylates, and the like, and mixtures thereof. Where necessary to provide the requisite impact resistance, such matrix polymers can be impact modified or toughened, so long as the method of impact modification, such as rubber toughening, does not adversely affect and undesirably reduce the optical transmission properties of the polymer. These thermoplastics and methods for their preparation are well known in the art within the purview of those skilled in the art.

Continuous absorption layers may include one or more types of thermoplastic film or sheet and the degree and type of absorption in the absorption layers may be controlled by the composition, thickness and method of processing of the thermoplastic film or sheet which comprises these layers.

The matrix material of the diffuser layers and continuous absorption layers can be a single material or a combination of two or more materials, and a variety of different materials can be used in the polymeric compositions of the present disclosure. The elongated structures of the dispersed phase materials in the diffuser layers are dispersed in the matrix material, and selections of the matrix and dispersed phase materials can be based on the optical, physical and thermal properties desired and the compatibility of the matrix and dispersed phase materials. Generally, any polymeric material with appropriate optical properties can be used as the matrix and dispersed phase materials as long as the combination provides the desired optical, physical and thermal properties.

Discontinuous contrast grid layers may be formed by selection of the types and amounts of the dyes or pigments and the grid pattern, dimensions, spacing, location and positioning. Where present, contrast grid layers may either be included in a separate layer or be incorporated onto or into other elements of the device, such as focusing prism and lens structures, by printing, scribing, embossing, laser marking, photopolymerization, photomasking techniques, or other suitable means. In some embodiments, a structure similar to the one disclosed in U.S. Pat. No. 5,543,870 may be utilized.

Support layers may include one or more types of thermoplastic or thermoset films or sheets or inorganic materials such as glass which have suitable optical properties.

In multilayer embodiments of the present disclosure, the layers may be bonded together by a lamination process, a co-extrusion process, a solvent bonding process such as a solvent welding process, a plastics welding process, an adhesive bonding process, a molding process, a co-molding process, an injection molding process, a co-injection molding process, a polymerization casting process, other types of in situ polymerization processes including ultra-violet, radiation, or heat curing techniques, or any other process which produces a multilayer structure, or any combination of these processes. The scattering and absorbing layers, and optionally other layers, can also be coextruded to form a multilayer structure. The scattering and absorbing layers, and optionally other layers, can also be produced by polymerization casting or other types of in situ polymerization, by ultra-violet or other radiation curing, or heat curing, to form a multilayer structure for the optical device of the present disclosure. Any or all of these processes can be used in combination to form the multilayer structure for the optical device of the present disclosure.

For devices of the present disclosure having more than one layer, such as those incorporating a separate scattering layer or layers, an interfacial layer may also be present between each of the various layers making up the structure of the optical device, and can include a separate adhesive layer or a transition zone between the aforesaid layers resulting from the manufacture of the multilayer system by lamination, coextrusion, solvent bonding, adhesive bonding, welding or other methods of construction.

Monolayer embodiments of the optical device of the present disclosure may be produced by methods such as sheet extrusion, transfer molding, compression molding, injection molding, thermoforming, polymerization casting, or other types of in situ polymerization such as by ultra-violet or other radiation curing or heat curing techniques, or other suitable fabrication methods which provide a suitable monolayer structure.

In a monolayer embodiment of the present disclosure, a carbon black pigment or other pigment, or a soluble dye such as a soluble black dye, for example an anthraquinone dye, can be incorporated into the scattering layer. In a multilayer embodiment, an optional absorbent layer may contain a carbon black pigment or other pigment, or a soluble dye such as a soluble black dye, for example an anthraquinone dye, or a contrast grid pattern of such appropriate pigment or dye can be applied onto or incorporated into the separate absorbent layer or incorporated onto or into other structural elements such as focusing prism and lens structures, including fresnel or lenticular lens structures. The pigment or dye may be applied to or incorporated into these elements by printing, scribing, embossing, laser marking, photopolymerization, photomasking techniques, or other suitable means.

The shape of the initially-produced monolayer or multilayer structure can be subsequently modified and constrained by standard forming methods such as thermoforming and/or by mounting it into a frame which holds it in a particular shape.

The devices of the present disclosure may also include one or more protective layers which protect the scattering and absorption layers from physical damage such as scratching or gouging, or may provide a modified surface texture such as a matte, non-reflective, anti-glare, antistatic or embossed surface to enhance the optical or other use properties of the device. The structure may also include one or more layers to focus the light rays or alter their angular direction before the light impinges on the diffuser layer, such as Fresnel, lenticular or other prism structures. In addition, the construction may also include one or more supporting layers to provide improved physical strength, stiffness, resistance to mechanical distortion, temperature resistance or other properties in the optical device. These supporting materials and thicknesses and the matrix materials and thicknesses used for the diffusion and tint layers are selected in combination to provide the requisite physical properties, for example, high modulus to provide rigidity for large screens (e.g. 3-4 meters square). Depending on the properties required, support layers may include one or more types of thermoplastic or thermoset films or sheets or inorganic materials such as glass which have suitable optical characteristics.

The device of the present disclosure may be used to display an image of light projected either in the transmission or reflection mode. The degree and type of scattering in the scattering layer(s) are controlled by the composition and processing of the polymeric materials used.

Thus, in some embodiments devices of the present disclosure may be utilized for the visualization of projected light images by transmission. Such a device typically includes at least one scattering layer and at least one absorption layer or contrast control layer, and optionally one or more interfacial layers, adhesive layers, protective layers, anti-glare layers, anti-reflection layers, antistatic layers, light focusing or light angle modification layers, and supporting layers. Such contrast control layers can include an absorption layer containing a pigment or dye or else a discontinuous contrast grid pattern including an appropriate pigment or dye. The pigment or dye or grid pattern may be applied onto or incorporated into the separate absorbent layer or incorporated onto or into other structural elements such as focusing prism or lens structures, including fresnel and lenticular lens structures, by printing, scribing, embossing, laser marking, photopolymerization, photomasking techniques, or other suitable means.

In the transmission mode, the light preferably enters the scattering layer, either directly or through optional contrast control layers, interfacial layers, adhesive layers, protective layers, anti-glare layers, anti-reflection layers, antistatic layers, light focusing or light angle modification layers and supporting layers. The light is then scattered forward to provide a combination of transmission gain (or brightness), resolution and scattering half angle, i.e. the angle from the normal angle to the surface at which the transmission is half that at the normal angle, which is controlled by the composition and processing methods used to make the scattering layer and its thickness. If a separate absorption layer is present on the side of the scattering layer opposite to the side upon which the light is incident, the light then passes through into the absorption layer where the frequency characteristics of the light can be modified. For example, the brightness of the image and the contrast may be controlled by selection of the types and amounts of the dyes or pigments incorporated in the continuous absorption layer or by selection of the types and amounts of the dyes or pigments and the grid pattern, spacing and positioning if a contrast grid is used. The light may also pass through interfacial layers, adhesive layers, protective layers, anti-glare layers, anti-reflection layers, antistatic layers and support layers, before or after passing through the absorption layer or grid. The resulting desired image may then be viewed from the side opposite to the side of the device from which the light enters the device.

In other embodiments, the present disclosure provides an asymmetric or elliptical viewing area optical device comprising at least one scattering layer for use as the backlight diffuser for liquid crystal displays. Such an optical device can provide improved optical efficiency compared with the symmetrical backlight diffusers currently employed.

In other embodiments, the present disclosure provides an asymmetric or elliptical viewing area optical device for the visualization of projected light images by reflection which comprises a reflection layer, at least one scattering layer, and optionally one or more absorption layers, contrast control layers, interfacial layers, adhesive layers, protective layers, anti-glare layers, anti-reflection layers, antistatic layers, light focusing or light angle modification layers, and supporting layers. In some embodiments, materials utilized to form the reflection layer may include metallized layer(s) or other reflective material(s), for example a metallized mirror-type layer such as a film coated with a reflective material such as silver by sputtering or other suitable processes.

In the reflection mode, the light typically enters from the absorption layer or contrast grid side, if a separate absorption layer or contrast grid is present, and then passes into the scattering layer and is reflected from the reflection layer placed immediately behind the scattering layer or separated from it by a thin clear layer or an absorbing layer which provides a flat surface for attachment of the reflection layer. The light then passes back through the scattering layer, where it undergoes more scattering and then again through the absorption layer or contrast grid, if a separate absorption layer or contrast grid is present, where it undergoes a final modification of frequency, color or contrast properties to provide the final desired image. The light may also pass through interfacial layers, adhesive layers, protective layers, anti-glare layers, anti-reflection layers, antistatic layers and support layers if they are incorporated into the device.

Where a continuous tint layer or a contrast grid structure are present, the tint layer typically is present on the viewing side (i.e. light non-incident side) of the diffuser layer, while a contrast grid structure typically is present on the light incident side of the diffuser layer, such as between a fresnel lens or any other structure and the diffuser layer. In other embodiments, a contrast grid structure may be incorporated into a support or other layer on the light incident side of the diffuser layer, or built into a fresnel lens or other structure such as on the light incident side of the fresnel lens.

The present disclosure also provides an asymmetric or elliptical viewing area optical device as described above which provides screens having substantially no grain, showing little or no scintillation, and substantially no hot spots or areas of excessive brilliance while diffusing the transmitted light over a wide area in the horizontal direction and a smaller and controllable area in the vertical direction.

The following examples are meant to illustrate aspects of the present disclosure and some of the ways in which it can be accomplished. Other ways of accomplishing the present disclosure will be recognized by those skilled in the art given the disclosures herein. The following examples are intended to be illustrative only and are not intended to limit the present disclosure.

EXAMPLE 1

A translucent thermoplastic composition containing a scattering species was extruded to produce a film or sheet which scattered polychromatic light and which acted as a scattering layer. This scattering layer included a mixture of a commercial acrylic molding resin Atoglas V-826 (Arkema), which is a methyl methacrylate polymer containing a small amount of copolymerized alkyl acrylate and having a melt flow rate of about 1.6 g/10 min as measured under Condition 1 of ASTM D-1238 as the matrix material, and a linear low density polyethylene (LLDPE) (Exxon LL1001.09) as the dispersed phase. These two components were dry blended and then compounded in a twin-screw extruder to produce pellets using a strand die at a melt temperature of about 240° C. These pellets were then dried and extruded with a single-screw extruder at a melt temperature of about 230° C. through an approximately 66-inch wide flat sheet die to produce a scattering film or sheet.

Compositions of varying ratios of LLDPE/Atoglas V-826, from 5/958 to 30/70, were prepared and their optical properties determined. The optical properties of the resultant film or sheet were determined by several different methods including light scattering in transmission and reflection modes using Yokogawa or Minolta light meters and a Photon Inc. goniometric radiometer, and an Olympus microscope. Refractive indices were determined with an Abbe refractometer. Optical properties measured included peak gain, viewing angle in various directions, resolution, surface reflection and diffuse transmission.

Optical properties of the asymmetric viewing area monolayer optical device are shown in Table 1.

TABLE 1

Diffuser layer - V-826. Diffuser type: LLDPE (LL1001.09). No tint.

| | | | Half Angle ° | |
| --- | --- | --- | --- | --- |
| Thickness mm | Diffuser Conc. % | Peak Gain | Vertical | Horizontal |
| 1.00 | 30 | 12.6 | 6.2 | 15.1 |
| 1.50 | 30 | 4.34 | 9.2 | 27 |
| 2.00 | 35 | 1.79 | 15 | 47 |

EXAMPLE 2

A transparent or semi-transparent thermoplastic containing a light absorber was extruded to produce a film or sheet which absorbs polychromatic light and acts as an absorber or tint layer. This absorber film comprised an acrylic molding resin Atoglas DR-101 (Rohm and Haas), which is an impact-modified methyl methacrylate polymer containing a small amount of copolymerized alkyl acrylate and having a melt flow rate of about 1 g/10 min measured under Condition 1 of ASTM D-1238, and a polymer-soluble black anthraquinone dye (Lambdaplast Black LN, Buckeye Color and Chemical LLC) in concentrations ranging from 0.003% to 0.07%. These components were dry blended and then compounded in a twin screw extruder to produce pellets using a strand die at a melt temperature of about 240° C. These pellets were then dried and extruded at a melt temperature of about 230° C. through an approximately 66-inch wide flat sheet die to produce an absorber film or sheet. The optical properties of the resultant film or sheet were determined as in Example 1.

EXAMPLE 3

The two thermoplastic compositions prepared in Examples 1 and 2 were co-extruded to produce a two-layer sheet structure wherein one layer scattered polychromatic light while the second layer absorbed the light and provided contrast. The optical properties of the resultant structure were determined as in Example 1. Results are shown in Table 2.

TABLE 2

Tint layer - DR-101. As prepared in Example 2. Thickness: 0.75 mm
Diffuser layer - As prepared in Example 1. Thickness: 1.50 mm

| | | | Half Angle ° | |
| --- | --- | --- | --- | --- |
| Tint Conc. % | Diffuser Conc. % | Peak Gain | Vertical | Horizontal |
| 0.02 | 26 | 2.73 | 5.5 | 24 |

EXAMPLE 4

The two films or sheets of Examples 1 and 2 were bonded together by a lamination process and the optical properties of the resultant structure determined as in Example 1. The resulting structure possessed optical properties essentially indistinguishable from those of Example 3.

EXAMPLE 5

The two films or sheets of Examples 1 and 2 were bonded together by a solvent bonding process and the optical properties of the resultant structure determined as in Example 1. The resulting structure possessed optical properties essentially indistinguishable from those of Example 3.

EXAMPLE 6

The film or sheet of Example 1 was produced but included a copolymer resin consisting of 60% methyl methacrylate and 40% styrene (MS resin TX-400 S Natural, Denki Kagaku K.K.) instead of V-826 as the matrix material. The optical properties of the resultant monolayer structure were determined as in Example 1. The results are shown in Table 3 below.

TABLE 3

Diffuser layer - MS Resin. Diffuser type: LLDPE (LL1001.09).
Thickness: 1.00 mm. No tint.

| | | Half Angle ° | |
| --- | --- | --- | --- |
| Diffuser Conc. % | Peak Gain | Vertical | Horizontal |
| 10 | 3.16 | 14 | 29 |
| 30 | 4.64 | 6.8 | 37.5 |

EXAMPLE 7

The film or sheet of Example 1 was produced but included Atoglas DR-101 impact modified methyl methacrylate copolymer (Arkema) instead of V-826 as the matrix material and incorporating Vector 4461 styrene/butadiene/styrene linear triblock copolymer (Dexco) as the dispersed phase. The optical properties of the resultant monolayer structure were determined as in Example 1. The results are shown in Table 4 below.

TABLE 4

Diffuser layer - DR-101. Diffuser type: Vector 4461 S/B/S
copolymer. Thickness: 1.00 mm No tint.

| | | Half Angle ° | |
| --- | --- | --- | --- |
| Diffuser Conc. % | Peak Gain | Vertical | Horizontal |
| 5 | 2.3 | 2.3 | 43 |

EXAMPLE 8

Example 7 was repeated except that the composition incorporated 4.5% of Vector 4461 and 2.4% of Paraloid 5136 core-shell modifier (Rohm and Haas). Paraloid 5136 is a spherical particle having an inner core of an alkyl acrylate copolymer surrounded by a methyl methacrylate copolymer as an outer layer. The size of the particles ranges from about 2 microns to about 10 microns. The optical properties of the resultant monolayer structure were determined as in Example 1. The results are shown in Table 5 below.

TABLE 5

Diffuser layer - DR-101. Diffuser type: Vector 4461 S/B/S
copolymer (4.5%) and Paraloid 5136 (2.4%). Thickness: 1.00 mm.
No tint.

| | Half Angle ° | |
| --- | --- | --- |
| Peak Gain | Vertical | Horizontal |
| 4.01 | 12 | 24 |

EXAMPLE 9

The film or sheet of Example 1 was produced but included Topas 8007 norbornene-ethylene based amorphous cyclic polyolefin polymer (Ticona) instead of V-826 as the matrix material and incorporated LL1001.09 linear low density polyethylene polymer and Paraloid 5136 core-shell modifier (Rohm and Haas) as the dispersed phases. The optical properties of the resultant monolayer structure were determined as in Example 1. The results are shown in Table 6 below.

TABLE 6

Diffuser Matrix layer - Topas 8007. Diffuser 1 type: LLDPE (LL1001.09). Diffuser 2 Type: Paraloid 5136. Thickness: 0.8 mm. No tint.

| Diffuser 1 Conc. % | Diffuser 2 Conc. % | Peak Gain | Half Angle ° Vertical | Horizontal |
|---|---|---|---|---|
| 20 | 3.0 | 5.5 | 12 | 17 |

EXAMPLE 10

The film or sheet of Example 1 was produced but included Atoglas MI7E-101 impact modified methyl methacrylate copolymer (Arkema) instead of V-826 as the matrix material and incorporated Fusabond EMB226D maleic anhydride grafted ethylene copolymer (DuPont) and Paraloid 5136 core-shell modifier (Rohm and Haas) as the dispersed phases. The optical properties of the resultant monolayer structure were determined as in Example 1. The results are shown in Table 7 below.

TABLE 7

Diffuser Matrix layer - MI7E-101. Diffuser 1 type: Fusabond EMB226D. Diffuser 2 Type: Paraloid 5136. Thickness: 1.02 mm. No tint.

| Diffuser 1 Conc. % | Diffuser 2 Conc. % | Peak Gain | Half Angle ° Vertical | Horizontal |
|---|---|---|---|---|
| 15 | 3.0 | 5.0 | 10 | 21 |

EXAMPLE 11

Example 10 was repeated but with the addition of 0.02% of Lamdaplast Black LN polymer-soluble black anthraquinone dye (Buckeye Color and Chemical LLC) to the matrix polymer. The optical properties of the resultant monolayer structure were determined as in Example 1. The results are shown in Table 8 below.

TABLE 8

Diffuser Matrix layer - MI7E-101. Diffuser 1 type: Fusabond EMB226D. Diffuser 2 Type: Paraloid 5136. Thickness: 1.02 mm. Tint: 0.02%

| Thickness mm | Diffuser 1 Conc. % | Diffuser 2 Conc. % | Peak Gain | Half Angle ° Vertical | Horizontal |
|---|---|---|---|---|---|
| 0.8 | 15 | 3.0 | 7.0 | 5.1 | 11.9 |
| 1.03 | 15 | 3.0 | 3.0 | 8.0 | 16.6 |

EXAMPLE 12

Example 10 was repeated but used 2% of Geniomer 140 thermoplastic urea-silicone copolymer (Wacker) in place of Fusabond EMB226D and 5% of Paraloid 5136. The optical properties of the resultant monolayer structure were determined as in Example 1. The results are shown in Table 9 below.

TABLE 9

Diffuser Matrix layer - MI7E-101. Diffuser 1 type: Geniomer 140. Diffuser 2 Type: Paraloid 5136. Thickness: 1.0 mm. No tint.

| Diffuser 1 Conc. % | Diffuser 2 Conc. % | Peak Gain | Half Angle ° Vertical | Horizontal |
|---|---|---|---|---|
| 2.0 | 5.0 | 1.8 | 15.5 | 30 |

EXAMPLE 13

Example 1 was repeated using Calibre V30206 polycarbonate (Dow Chemical) as the matrix polymer and Nyglos 4W wollastonite (Nyco Minerals) as the preformed acicular scattering material, except that the components were not dry blended but were compounded in a twin-screw extruder equipped to allow the wollastonite mineral to be introduced into the matrix polymer melt towards the exit of the extruder to minimize fracturing of the wollastonite and reduction in its aspect ratio. The resulting compounded was then extruded through a single-screw extruder with a flex-lip die to make a sheet. The optical properties of the resultant monolayer structure were determined as in Example 1. The results are shown in Table 10 below.

TABLE 10

Diffuser Matrix layer - V30206 Polycarbonate. Diffuser type: Nyglos 4W wollastonite. Thickness: 1.1 mm. No tint.

| Diffuser Conc. % | Peak Gain | Half Angle ° Vertical | Horizontal |
|---|---|---|---|
| 10.0 | 6.0 | 9 | 17 |

EXAMPLE 14

Example 13 was repeated with the addition of 0.5% Paraloid 5136 core-shell modifier as an additional diffuser to the Nyglos 4W. The optical properties of the resultant monolayer structure were determined as in Example 1. The results are shown in Table 11 below.

TABLE 11

Diffuser Matrix layer - V30206 Polycarbonate. Diffuser 1 type: Nyglos 4W wollastonite. Diffuser 2 Type: Paraloid 5136. Thickness: 1.1 mm. No tint.

| Diffuser 1 Conc. % | Diffuser 2 Conc. % | Peak Gain | Half Angle ° Vertical | Horizontal |
|---|---|---|---|---|
| 10.0 | 0.5 | 2.04 | 17.6 | 25.6 |

The above description should not be construed as limiting, but merely as exemplifications of typically useful embodiments. It will be understood that various modifications may be made to the embodiments disclosed herein. For example, as those skilled in the art will appreciate, the specific materials and amounts described herein can be altered slightly without necessarily adversely affecting the functionality of the devices of the present disclosure. Therefore, the above description should not be construed as limiting, but merely as exemplifications of useful embodiments. Those skilled in the art will envision other modifications within the scope and spirit of this disclosure.

What is claimed is:

1. A multilayer asymmetric viewing area optical display device comprising a contrast-control layer comprising at least one discontinuous contrast grid pattern, in combination with one or more light-scattering layers comprising at least one thermoplastic matrix and at least one dispersed phase, wherein the dispersed phase of the light scattering layer comprises from about 0.2% to about 50% by volume of the light scattering layer and includes domains or particles having an elongated, ellipsoidal, rod-like, acicular, or prismatic shape which are immiscible with the thermoplastic matrix.

2. The optical display device of claim 1 further comprising one or more light absorption layers, contrast control layers, interfacial layers, adhesive layers, protective layers, matte layers, non-reflective layers, anti-glare layers, antistatic layers, embossed surface layers, focusing layers, reflection layers and supporting layers.

3. The optical display device of claim 1 wherein visualization of projected light images for viewing occurs by reflection.

4. The optical display device of claim 1 wherein visualization of projected light images for viewing occurs by transmission.

5. The optical display device of claim 1 wherein the thermoplastic matrix for the scattering layer is selected from the group consisting of alkyl methacrylate polymers, styrenic polymers, methacrylate copolymers, styrenic copolymers, olefin polymers, olefin copolymers, polycarbonates, polysulfones, sulfone copolymers, cyclic polyolefins, cyclic polyolefin copolymers, polyesters, and cellulose esters.

6. The optical display device of claim 1 wherein the thermoplastic matrix for the scattering layer is selected from the group consisting of methyl methacrylate/alkyl acrylate copolymers, methyl methacrylate/styrene copolymers, norbornene-ethylene amorphous polymers, and polymethyl pentene polymers.

7. The optical display device of claim 1 wherein the dispersed phase comprises an immiscible polymer which forms elongated domains in the thermoplastic matrix.

8. The optical display device of claim 7 wherein the dispersed phase is selected from the group consisting of polyolefins, olefin copolymers, styrene random and block copolymers, methacrylate polymers and copolymers, acrylate polymers and copolymers, silicone copolymers, cellulose esters and carboxylated cellulose derivatives.

9. The optical display device of claim 8 wherein the polyolefin comprises a linear low density polyethylene polymer.

10. The optical display device of claim 8 wherein the olefin copolymer comprises a random or grafted ethylene copolymer with an anhydride or acid.

11. The optical display device of claim 8 wherein the styrene block copolymer comprises a block copolymer with a monomer selected from the group consisting of butadiene, isoprene, and hydrogenated butadiene, and hydrogenated isoprene.

12. The optical display device of claim 8 wherein the silicone copolymer comprises a thermoplastic urea-silicone copolymer.

13. The optical display device of claim 8 wherein the cellulose ester or cellulose derivative is selected from the group consisting of cellulose propionate, cellulose butyrate, and carboxymethylcellulose.

14. The optical display device of claim 1 wherein the dispersed phase is selected from the group consisting of preformed elongated or deformable polymer particles, crosslinked particles, and core-shell particles.

15. The optical display device of claim 1 wherein the dispersed phase is selected from the group consisting of high aspect ratio glass particles, mineral particles, and ceramic particles.

16. The optical display device of claim 1 wherein the dispersed phase is selected from the group consisting of wollastonite, strontium carbonate, and clay.

17. The optical display device of claim 16 wherein the dispersed phase further comprises a coating selected from the group consisting of organic materials, inorganic materials, and polymeric materials.

18. The optical display device of claim 1 wherein the dispersed phase comprises a combination of elongated scattering domains and spherical domains.

19. The optical display device of claim 1 wherein the scattering layer further comprises a polymer-soluble dye.

20. The optical display device of claim 19 wherein the polymer-soluble dye comprises a black anthraquinone dye.

21. The optical display device of claim 1 wherein the thermoplastic matrix material of the scattering layer and the dispersed phase of the scattering layer have a difference in refractive index of from about 0.003 units to about 0.1 units.

22. The optical display device of claim 1 wherein the thermoplastic matrix material of the scattering layer and the dispersed phase of the scattering layer have a difference in refractive index of from about 0.01 units to about 0.03 units.

23. The optical display device of claim 1 wherein the dispersed phase of the light scattering layer comprises particles having a mean diameter in the minor direction of from about 0.2 microns to about 20 microns.

24. The optical display device of claim 1 wherein the dispersed phase of the light scattering layer comprises particles having a mean length in the major direction of from about 1 micron to about 200 microns.

25. The optical display device of claim 1 further comprising an absorption layer comprising at least one thermoplastic matrix.

26. The optical display device of claim 25 wherein the thermoplastic matrix for the absorption layer may be the same or different as the thermoplastic matrix of the light-scattering layer and is selected from the group consisting of alkyl methacrylate polymers, styrenic polymers, methacrylate copolymers, styrenic copolymers, olefin polymers, olefin copolymers, polycarbonates, polysulfones, sulfone copolymers, cyclic polyolefins, polyesters, and cellulose esters.

27. The optical display device of claim 25 wherein the absorption layer further comprises a polymer-soluble dye.

28. The optical display device of claim 25 wherein the thermoplastic matrix comprises a polymethyl methacrylate/alkyl acrylate copolymer and the polymer-soluble dye comprises a black anthraquinone dye.

29. The optical display device of claim 1 wherein the contrast-control layer comprises a grid pattern selected from the group consisting of patterns placed onto a separate absorbent layer, patterns incorporated into a separate absorbent layer, patterns applied onto other structural elements of the device, and patterns incorporated into other structural elements of the device.

30. The optical display device of claim 29 wherein the other structural elements of the device are selected from the group consisting of focusing prisms, light angle modification structures, fresnel lens-type structures, and lenticular lens-type structures.

31. The optical display device of claim 1 wherein the layers of the device are bonded together by a lamination process, a solvent welding process, an adhesive bonding process, a plastics welding process, a molding process, an injection molding process, a co-injection molding process, a coextrusion process, or by a combination of such processes.

32. The optical display device of claim 1 wherein the optical display device comprises a multilayer structure formed by coextrusion.

33. The optical display device of claim 1 wherein the layers of the device are produced by in situ polymerization, ultra-violet curing, radiation curing, and heat curing.

34. The optical display device of claim 1 wherein the layers of the device are produced by a molding process, an injection molding process, a co-injection molding process, a coextrusion process, in situ polymerization, ultra-violet curing, radiation curing, heat curing, or by a combination of such processes.

35. A backlight diffuser for a liquid crystal display comprising the optical display device of claim 1.

* * * * *